(12) United States Patent
Seymour et al.

(10) Patent No.: US 11,750,679 B1
(45) Date of Patent: *Sep. 5, 2023

(54) SYSTEMS AND METHODS FOR IT MANAGEMENT OF DISTRIBUTED COMPUTING RESOURCES ON A PEER-TO-PEER NETWORK

(71) Applicant: EDJX, INC., Raleigh, NC (US)

(72) Inventors: Delano Seymour, St George's (BM); James A. Thomason, Las Vegas, NV (US)

(73) Assignee: EDJX, INC., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/085,144

(22) Filed: Dec. 20, 2022

Related U.S. Application Data (63) Continuation of application No. 17/490,775, filed on Sep. 30, 2021, now Pat. No. 11,546,168, which is a
(Continued)

(51) Int. Cl.
*H04L 65/80* (2022.01)
*G06F 9/50* (2006.01)
(Continued)

(52) U.S. Cl.
CPC ............ *H04L 65/80* (2013.01); *G06F 9/5044* (2013.01); *G06F 9/5066* (2013.01);
(Continued)

(58) Field of Classification Search
CPC ..... H04L 65/80; H04L 9/0637; H04L 9/3239; H04L 67/01; H04L 69/22; H04L 67/12; H04L 67/10; H04L 43/0888; H04L 63/1458; H04L 63/1425; H04L 67/535; H04L 67/02; H04L 43/0876; H04L 41/0813; H04L 41/0806; H04L 41/5025; H04L 43/16; H04L 41/0896; H04L 43/0817; H04L 67/51; H04L 9/0643; G06F 9/5066; G06F 9/5044; G06F 16/535; G06F 9/5072; G06F 21/64; G06F 18/213; G06F 16/538; G06F 18/21; G06F 16/951; G06F 21/53; G06F 21/45; G06F 9/4881; G06F 21/44; G06F 21/6254; G06F 16/54; G06F 18/211; G06F 18/24; G06F 18/2163; G06F 18/22; G06F 18/24143; G06K 15/1886;
(Continued)

(56) References Cited

U.S. PATENT DOCUMENTS

10,171,523 B2   1/2019   Chakraborti et al.
2017/0242737 A1  8/2017   Fink et al.
(Continued)

*Primary Examiner* — Kyung H Shin
(74) *Attorney, Agent, or Firm* — NEO IP (57) ABSTRACT

Systems and methods for managing distributed computing resources including blockchain-based management of serverless computing and edge computing. Distributed computing resources are managed on a peer-to-peer network, and serverless functions are hosted on a distributed IT infrastructure. Developers for the serverless functions and providers of distributed IT infrastructure utilize a blockchain-based IT marketplace platform to make transactions relating to computing resource consumption.

20 Claims, 6 Drawing Sheets

Related U.S. Application Data continuation of application No. 17/185,383, filed on Feb. 25, 2021, now Pat. No. 11,140,226, which is a continuation of application No. 16/809,181, filed on Mar. 4, 2020, now Pat. No. 10,986,184.

(60) Provisional application No. 62/813,839, filed on Mar. 5, 2019.

(51) Int. Cl.
| | | |
|---|---|---|
| *H04L 9/32* | (2006.01) | |
| *H04L 67/104* | (2022.01) | |
| *H04L 9/40* | (2022.01) | |
| *G06Q 40/04* | (2012.01) | |
| *H04L 67/12* | (2022.01) | |
| *H04L 41/0806* | (2022.01) | |
| *G06V 10/40* | (2022.01) | |
| *H04L 61/4511* | (2022.01) | |
| *G06N 3/063* | (2023.01) | |
| *H04L 43/0876* | (2022.01) | |
| *H04L 9/00* | (2022.01) | |

(52) U.S. Cl.
CPC ............ *G06F 9/5072* (2013.01); *G06N 3/063* (2013.01); *G06Q 40/04* (2013.01); *G06V 10/40* (2022.01); *H04L 9/3239* (2013.01); *H04L 41/0806* (2013.01); *H04L 43/0876* (2013.01); *H04L 61/4511* (2022.05); *H04L 63/0281* (2013.01); *H04L 63/1458* (2013.01); *H04L 67/104* (2013.01); *H04L 67/12* (2013.01); *H04L 9/50* (2022.05); *H04L 63/1425* (2013.01)

(58) Field of Classification Search
CPC .. G06V 10/20; G06V 10/75; G06V 30/19173; G06V 10/96; G06V 40/161; G06V 10/95; G06V 40/20; G06V 10/40; G06V 10/454; G06V 20/00; G06V 30/274; G06V 10/82; G06N 3/045; G06N 5/022; G06N 3/04; G06N 3/063; G06N 3/08; H04N 19/46; H04N 19/80; G06T 7/11; G06T 7/70; H04W 4/70
See application file for complete search history.

(56) References Cited

U.S. PATENT DOCUMENTS

| | | | |
|---|---|---|---|
| 2017/0264486 A1* | 9/2017 | Angell | ................ H04L 43/0876 |
| 2018/0005186 A1 | 1/2018 | Hunn | |
| 2018/0034924 A1 | 2/2018 | Horwood | |
| 2018/0113793 A1 | 4/2018 | Fink et al. | |
| 2018/0198818 A1* | 7/2018 | Andrews | ................ H04L 65/80 |
| 2019/0028552 A1 | 1/2019 | Johnson et al. | |
| 2019/0042867 A1* | 2/2019 | Chen | .................... G06F 9/5066 |

* cited by examiner

SYSTEMS AND METHODS FOR IT MANAGEMENT OF DISTRIBUTED COMPUTING RESOURCES ON A PEER-TO-PEER NETWORK

CROSS REFERENCES TO RELATED APPLICATIONS

This application is related to and claims priority from the following U.S. patents and patent applications. This application is a continuation of U.S. patent application Ser. No. 17/490,775, filed Sep. 30, 2021, which is a continuation of U.S. patent application Ser. No. 17/185,383, filed Feb. 25, 2021, which is a continuation of U.S. patent application Ser. No. 16/809,181, filed Mar. 4, 2020, which claims priority from U.S. Provisional Patent Application No. 62/813,839, filed Mar. 5, 2019. Each of the above listed applications is incorporated herein by reference in its entirety.

BACKGROUND OF THE INVENTION

1. Field of the Invention

This invention relates to systems and methods for distributed computing management on a peer-to-peer network. More particularly, for blockchain-based internet technology (IT) management of serverless computing and edge computing.

2. Description of the Prior Art

Serverless computing is a new type of computing model. While serverless computing still uses cloud servers to run applications, it removes the need for developers or system administrations to plan and manage the infrastructure resources offered by cloud computing providers.

AWS Lambda introduced by Amazon in 2014 was the first public cloud infrastructure vendor with an abstract serverless computing offering, which charges based on number and duration of requests executed with functions. Google Cloud Platform started to offer Google Cloud Functions in 2016. Serverless computing had grown from 12% adoption in early 2017 to 21% adoption in early 2018, according to a survey conducted by cloud management company RightScale. The serverless computing industry is estimated to grow from approximately $1.88B in 2016 to $7.72B by 2021, according to CB Insights.

Exemplary U.S. Patent Documents relevant to the prior art include:

U.S. Patent Publication No. 2019/0028552 for "Managing a distributed network of function execution environments" by inventors Pete Johnson II et al., filed Nov. 8, 2017 and published Jan. 24, 2019, describes systems, methods, and computer-readable media for managing a distributed network of function execution environments. In some examples, a function router registers a plurality of execution endpoints on a catalog of execution endpoints and functions, each of the plurality of execution endpoints including a respective runtime environment capable of executing one or more functions. The function router receives, from a client, a request to execute a particular function and, based on the request, queries the catalog for the particular function and execution endpoints associated with the particular function. The function router receives a query response identifying one or more execution endpoints associated with the particular function, and selects an execution endpoint for executing the particular function based on one or more criteria associated with the request. The function router then sends to the client a response identifying the execution endpoint selected for executing the particular function.

U.S. Pat. No. 10,171,523 for "Multi-tier push service control architecture for large scale conference over ICN" by inventors Asit Chakraborti et al., filed May 16, 2014 and issued Jan. 1, 2019, describes a network element (NE) comprising a memory configured to store a digest log for a conference, a receiver coupled to the memory and configured to receive a first message from a first of a plurality of service proxies of the conference, wherein the first message comprises a signature profile of a first of a plurality of participants of the conference associated with the first service proxy, a processor coupled to the receiver and the memory and configured to track a state of the conference by updating the digest log according to the first message, and a transmitter coupled to the processor and configured to send a plurality of second messages to indicate the digest log update to the service proxies without a transmission request from the service proxies.

U.S. Patent Publication No. 2018/0113793 for "Facilitating debugging serverless applications via graph rewriting" by inventors Stephen Fink et al., filed Dec. 13, 2017 and published Apr. 26, 2018, describes techniques that facilitate re-hosting a subset of a serverless application. In one example, a system includes an interface component, a rewriter component and a broker component. The interface component receives identifier data from a computing device that identifies a portion of a serverless application to be re-hosted by the computing device. The computing device is in communication with the serverless computing system via a network device. The rewriter component rewrites the serverless application to allow the first portion of the serverless application to be executed by the computing device and another portion of the serverless application to be executed by the serverless computing system. The interface component re-routes the first portion of the serverless application to the computing device to facilitate a debugging session for the first portion of the serverless application that is performed by the computing device.

U.S. Patent Publication No. 2017/0242737 for "Managing external feeds in an event-based computing system" by inventors Stephen Fink et al., filed Dec. 9, 2016 and published Aug. 24, 2017, describes that at a cloud platform, a class of feed is received for an external feed corresponding to an information source, as are an instruction corresponding to a create operation for the external feed, and a dictionary input corresponding to parameters expected by the information source. The external feed produces a corresponding class of events. At the cloud platform, a handler is selected based on the received class of feed and the received create operation; the input dictionary is transferred to the handler; and the handler generates a unique destination to receive events for the class of events. The handler on the cloud platform generates a unique request to the information source to generate events of the class of feed to the unique destination and sends the request to the information source. Events generated from the information source responsive to the unique request are received at the unique destination.

U.S. Patent Publication No. 2018/0034924 for "System and method for a unified interface to networked web services" by inventor Keith Horwood, filed Jul. 28, 2017 and published Feb. 1, 2018, describes a system and method for a function-as-a-service platform that includes creating a set of distinct webservices within a webservice hosting platform, which involves receiving a webservice resource definition, processing the webservice resource definition, and instantiating a webservice of the webservice resource definition within the webservice hosting platform; and invoking a webservice instantiated in the webservice hosting platform for a client device, which involves: receiving a webservice function call request, executing the webservice function call request on a webservice instance, and responding to the webservice function call request with a result of the webservice.

U.S. Patent Publication No. 2018/0005186 for "System and method for forming, storing, managing, and executing contracts" by inventors Peter Geoffrey Lerato Hunn et al., filed Jun. 30, 2017 and published Jan. 4, 2018, describes a system and method for computable contracts that includes a contract management system accessible by involved parties, managing a formation stage of a contract document by obtaining object components, assembling a contract object graph from the object components, and committing the contract object graph to post formation execution; and in an execution environment during a post-formation stage, executing the contract object graph where instances of execution include receiving a contract state update, and appending at least one update object component to the contract object graph in accordance with the contract state update. Variations of the system and method may apply peer-to-peer negotiation and execution, use a cryptographic directed acyclic contract object graph, and/or interface with distributed ledgers.

SUMMARY OF THE INVENTION

The present invention provides systems and methods for management of distributed computing resources based on a peer-to-peer network. Serverless functions are hosted on distributed information technology (IT) infrastructure. Developers for the serverless functions and providers of distributed IT infrastructure make transactions for computing resource consumption on a blockchain-based IT marketplace platform. In one embodiment of the present invention, distributed IT infrastructure is tokenized and monetized on the blockchain-based IT marketplace platform. The blockchain-based IT marketplace platform witnesses and validates the transactions for distributed computing resource consumption. In one embodiment of the present invention, the transactions are facilitated with tokens.

In one embodiment, the present invention includes a system for managing distributed computing resources including a blockchain-based edge computing marketplace platform, wherein the blockchain-based edge computing marketplace platform is in network communication with at least one client device, a plurality of smart meters for measuring edge computing resource capacity and/or edge computing resource consumption, a plurality of infrastructure nodes, wherein the plurality of infrastructure nodes is operable for network communication with the blockchain-based edge computing marketplace platform, the at least one client device, and the plurality of smart meters, and wherein each of the plurality of infrastructure nodes is associated with a blockchain account, wherein the blockchain-based edge computing marketplace platform includes at least one Graphical User Interface (GUI), wherein the blockchain-based edge computing marketplace platform includes at least one application program, wherein the at least one application program is operable to be accessed over a network by the at least one client device, wherein the at least one application program includes an application identifier (ID), wherein the plurality of infrastructure nodes is operable to receive a function request from the at least one client device, wherein the function request corresponds to the at least one application program, wherein the plurality of infrastructure nodes is operable to retrieve a function corresponding to the function request from an object storage server, wherein the function corresponding to the function request includes a hash value, wherein the plurality of infrastructure nodes is operable to validate the hash value for the function corresponding to the function request, wherein the function transitions to a validated function once the hash value for the function is validated, wherein execution of the validated function results in at least one computing resource transaction, and wherein the at least one computing resource transaction is recorded on a blockchain.

In another embodiment, the present invention includes a system for managing distributed computing resources including a blockchain-based edge computing marketplace platform, wherein the blockchain-based edge computing marketplace platform is in network communication with at least one client device, at least one blockchain router in network communication with the blockchain-based edge computing marketplace platform, a plurality of infrastructure nodes, wherein the plurality of infrastructure nodes is operable for network communication with the blockchain-based edge computing marketplace platform and the at least one client device, an infrastructure node database, wherein the infrastructure node database is operable to store information corresponding to each of the plurality of infrastructure nodes, a domain name system (DNS) database, wherein the DNS database is operable to receive a first query request from the at least one client device, wherein the blockchain-based edge computing marketplace platform includes at least one application program with at least one function, wherein the at least one application program is operable to be accessed over a network by the at least one client device, wherein the at least one application program includes an application identifier (ID), wherein the at least one blockchain router is operable to access the infrastructure node database, wherein the DNS database is operable to send a first query response to the at least one client device, wherein the first query response is an address instance of a blockchain proxy, wherein the blockchain proxy is operable for network communication with the at least one client device and the at least one blockchain router, wherein the blockchain proxy is operable to receive a second query request from the at least one client device, wherein the second query request contains the at least one function, wherein the blockchain proxy is operable to send a second query response to the client device, wherein the second query response indicates a nearest infrastructure node from the plurality of infrastructure nodes, wherein the nearest infrastructure node is the closest of the plurality of infrastructure nodes in geolocation to the at least one client device, and wherein the nearest infrastructure node is connected to the at least one client device, wherein the at least one function is executed once the nearest infrastructure node is connected to the at least one client device.

In yet another embodiment, the present invention includes a method for managing distributed computing resources including providing a blockchain-based edge computing marketplace platform in network communication with at least one client device, a plurality of smart meters for measuring edge computing resource capacity and/or edge computing resource consumption, and a plurality of infrastructure nodes, accessing at least one application program over a network using the at least one client device, wherein the at least one application program includes an application identifier (ID), the plurality of infrastructure nodes receiving a function request from the at least one client device, wherein the function request corresponds to the at least one application program, the plurality of infrastructure nodes retrieving a function corresponding to the function request from an object storage server, wherein the function corresponding to the function request includes a hash value, the plurality of infrastructure nodes validating the hash value for the function corresponding to the function request, wherein the function transitions to a validated function once the hash value for the function is validated, executing at least one transaction for computing resource associated with running the at least one application program on the at least one client device, and recording the at least one computing resource transaction on a blockchain, wherein each of the plurality of infrastructure nodes is associated with a blockchain account, and wherein the blockchain-based edge computing marketplace platform includes at least one Graphical User Interface (GUI).

These and other aspects of the present invention will become apparent to those skilled in the art after a reading of the following description of the preferred embodiment when considered with the drawings, as they support the claimed invention.

DETAILED DESCRIPTION

The present invention relates to systems and methods for management of distributed computing resources based on a peer-to-peer network. More particularly, for blockchain-based information technology (IT) management of serverless computing and edge computing. The present invention provides systems and methods for managing distributed computing resources on a blockchain-based IT marketplace platform.

Serverless computing removes the need to pay for pre-defined computing capacity and storage in cloud computing, allowing businesses to only pay for the resources consumed by their applications. Serverless computing improves the functionality and the development process of all types of applications overall.

A key aspect of serverless computing is functions. Functions are small, independent pieces of code that complete specific requests, providing developers with more operational flexibility and cost savings when building, deploying, and running applications. The management and deployment of functions is referred to as function-as-a-service (FaaS), which is synonymous with serverless computing.

With smart sensors and Internet of Things (IoT) devices gaining popularity and collecting vast amounts of data, centralized cloud systems are facing challenges to better manage and handle all edge devices and their data. For example, according to a report from Research And Markets "Global Edge Computing Market-Forecasts from 2018 to 2023" and a report from Grandview Research "Edge Computing market Worth $3.24 Billion By 2025 | CAGR: 41.0%," devices connecting people and things will grow 3 times between 2019 and 2025 to over 75 billion, data generated at the edge will explode 5 times from 520 zettabytes in 2019 to over 2500 zettabytes by 2024, and there will be a massive 64-zettabyte shortfall in bandwidth to the cloud by 2021 as computing moves into the real world. It is costly to build data centers to store and process the huge amount of data from connected devices. For example, for just 1 zettabytes of data, 1000 data centers are needed, which would occupy about 20% of Manhattan and cost $250 Billion. There is a gap between IoT devices and cloud networks which causes larger latency, and limits storage capacity. Edge computing, as a new computing paradigm, pushes applications, data, and computing power away from centralized servers to the edge of the network. Edge computing is a distributed computing model in which computations are largely performed on distributed edge devices as opposed to primarily taking place in a centralized cloud environment.

The emergence of these modern computing architectures is also expected to increase the demand for greater transparency in the market. Much like personal consumers of utilities such as electricity or bandwidth can internalize, compare, and switch providers in the market, IT consumers will expect a similar experience and have already begun to demand it.

Decentralized peer-to-peer networks represents the next generation platform architecture, where serverless partners push computing and its transactions to the edge of the network. The transaction records, payments, community adjudication, Application Programming Interface (API) frameworks, security, and resilience do not require central trust. Serverless partners do not require reliance on any one source of supply to meet the needs of demand, but purchase any available computing resources on a decentralized peer-to-peer network.

The present invention provides an edge computing network, where heterogeneous edge computing resources are clustered to provide computing capacities and owners of those computing resources get compensated by providing unused computing resources to host and execute serverless functions.

In one embodiment, the present invention provides an edge computing network with zero-touch infrastructure. The computing nodes on the edge computing network are self-maintaining and of high performance. In one embodiment, the computing nodes have solid-state drive (SSD) storage and high-speed networking (e.g., 10 Gbps). The edge computing network will transform various industries, for example but not for limitation, smart cities, aviation, manufacturing, transportation, maritime, energy, etc.

In one embodiment, the edge computing network of the present invention repurposes hyperscale computing equipment to create a circular economy at the network edge. Customers get ubiquitous edge computing without capital expense, hyperscale partners earn recurring revenue from fully depreciated assets, and facility partners earn recurring revenue by hosting edge servers in their locations. For example, deploying edge servers at commercial real estate properties creates a passive revenue stream for building owners and managers with little to no operating overhead cost, and turns commercial real estate properties into strategic player in the digital economy.

In one embodiment, the edge computing network of the present invention is a distributed peer-to-peer (P2P) computing platform for creating planet-scale applications using edge-functions-as-a-service (EFaaS). In one embodiment, the distributed P2P computing platform includes a blockchain, which can be private or public. Developers are enabled to create and push functions to the blockchain-based edge computing platform. Applications, machines, and connected devices execute serverless functions and consume proximal computing resources by milliseconds. Utilization is recorded to the blockchain where multi-party settlement is coordinated and documented instantly.

In one embodiment, the blockchain-based edge computing network of the present invention provides a decentralized and distributed IT marketplace platform for buying and selling distributed IT infrastructure capacities. The decentralized and distributed IT marketplace platform is based on the distributed ledger technology. A blockchain is a decentralized and distributed ledger to record transactions across peer computers. Transactions on the blockchain are managed autonomously by users on a peer-to-peer network. In one embodiment, the present invention provides a blockchain-based edge computing marketplace platform for distributed IT infrastructure consumption transactions. U.S. Provisional Patent Application No. 62/691,326 filed Jun. 28, 2018, which is assigned to the Applicant of the present application, is incorporated herein by reference in its entirety.

In one embodiment, the blockchain-based edge computing marketplace platform has metering functions to measure computing resource capacity and consumption. In one embodiment, the blockchain-based IT marketplace platform meters and measures computing resource capacity and consumption based on the Workload Allocation Cube (WAC) algorithm disclosed in U.S. Pat. No. 8,756,302, which is incorporated herein by reference in its entirety. The WAC algorithm aggregates six (6) key underlying utilization metrics required to operate any software application into a single unit of measure: CPU (Hz), Memory (Bytes), Storage (Bytes), Disk I/O (Bytes/sec), LAN I/O (Bytes/sec) and WAN I/O (Bytes/sec). The WAC is calculated by taking individual readings of each compute resource, then combining them and posting them into a single hour WAC reading. WAC is scalable to different orders of magnitude for measurement. For instance, 1000 WACs can be expressed as 1 kWAC, and 0.001 WAC can be expressed as 1 mWAC.

The WAC provides normalization of consumption metering across various resources, infrastructures, vendors, and providers. The WAC establishes a single, standardized proxy value for IT capacity and consumption. The WAC is the basis on which the IT supply chain can be treated like any other true utility. The normalization of measurement provides an "apples-to-apples" comparison of consumption, regardless of the underlying hardware or software technology stack. The WAC allows for measurement of IT infrastructure usage across public, private, physical and virtual infrastructure, regardless of location, underlying technology or management. Moreover, the WAC is compatible in the serverless computing era of consuming "function" as a service.

In one embodiment, the blockchain-based edge computing marketplace platform utilizes WAC-based smart meters for measuring edge computing resource capacity and consumption. In one embodiment, a new token is created on the blockchain-based IT marketplace platform to facilitate transactions, and the value of the new cryptocurrency token is backed by physical IT assets. In one embodiment, the new token is called the kWAC Token (kWT).

Figure 1:
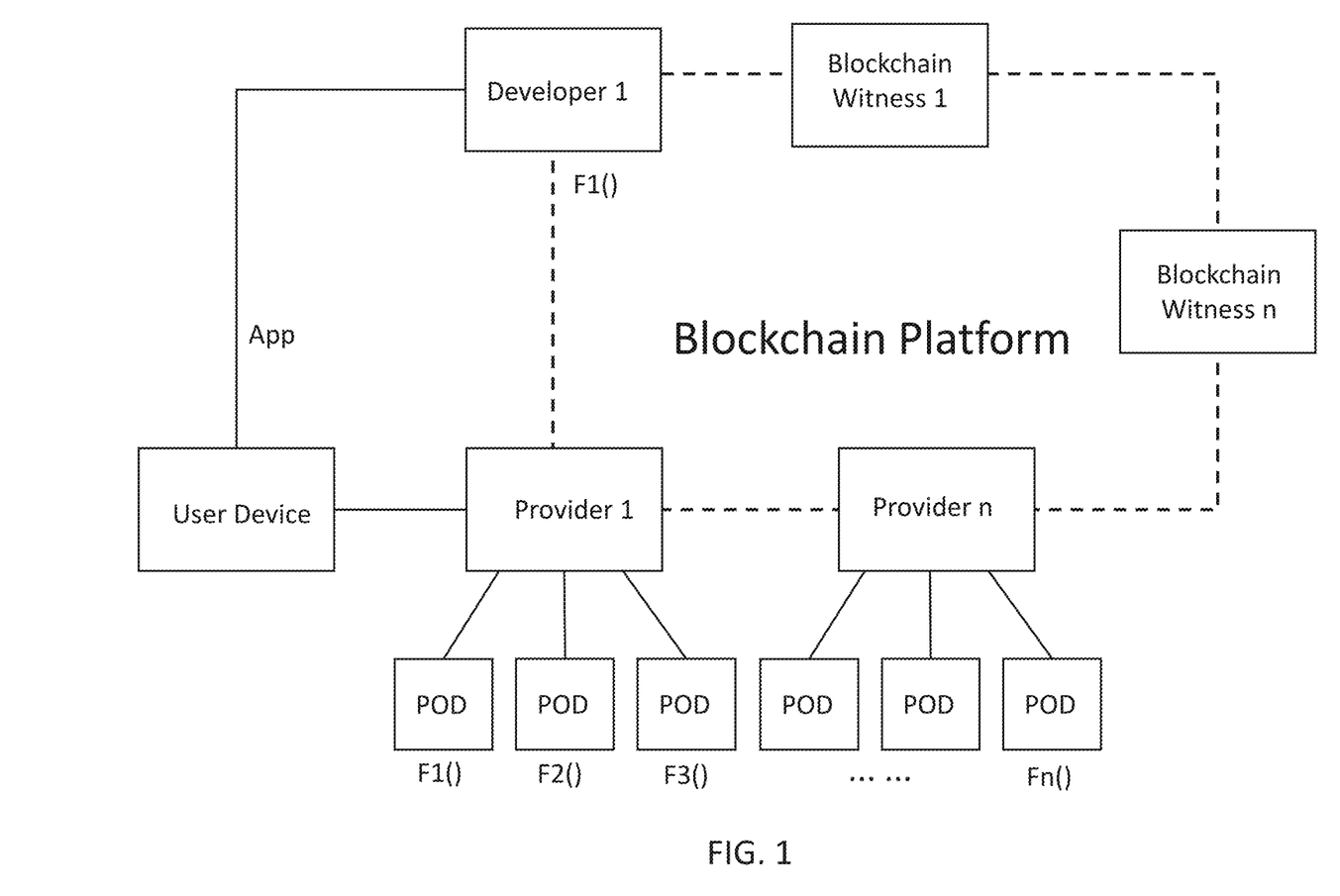
FIG. 1 illustrates different parties on a blockchain-based edge computing marketplace platform according to one embodiment of the present invention.

FIG. 1 illustrates different parties on a blockchain-based edge computing marketplace platform according to one embodiment of the present invention.

In one embodiment, the blockchain-based edge computing marketplace platform is an ecosystem including a multiplicity of providers and developers. A provider owns certain computing resource infrastructure, a developer creates serverless functions on the distributed computing resources owned by the providers, and a user runs the serverless functions via an application programs installed on a user device (e.g., mobile devices, sensors, virtual reality (VR) headsets, etc.). In one embodiment, one provider has a multiplicity of distributed computing resource modules. In one embodiment, one computing resource module is a point of delivery (POD) operable for hosting a multiplicity of serverless functions.

In one embodiment, the developer and the provider each have a blockchain account on the blockchain-based edge computing marketplace platform. The developer creates and pushes serverless functions via the developer blockchain account to the blockchain-based edge computing marketplace platform where a provider having available computing resources bids or offers to provide computing resources for the serverless functions. A smart contract is deployed between the developer and the provider regarding computing resource usage. The serverless functions are then stored on one or more PODs of the provider. Once a user device runs an application program developed by a developer and runs a corresponding serverless function utilizing computing resource from the provider, it initiates a transaction between the user and the provider, and also a transaction between the provider and the developer for the computing resource utilization of the serverless function. The transaction between the provider and the developer is executed based on the smart contract and witnessed and validated by other parties (e.g., developers, providers, etc.) on the blockchain-based IT marketplace platform. The transaction between the provider and the developer is fulfilled by exchanging tokens between the developer blockchain account and the provider blockchain account on the blockchain-based edge computing marketplace platform. In one embodiment, the blockchain account functions as a wallet holding tokens for its owner. In one embodiment, the blockchain account records information about activities for its owner. For example, a developer blockchain account records the serverless functions the developer deployed via the blockchain-based edge computing marketplace platform, and the provider blockchain account records its computing resource capacity and utilization. Witnesses on the blockchain-based edge computing marketplace platform includes peer developers and providers. In one embodiment, witnesses are incentivized for witnessing and validating the transactions by earning cryptocurrency tokens created on the blockchain-based IT marketplace platform.

Figure 2:
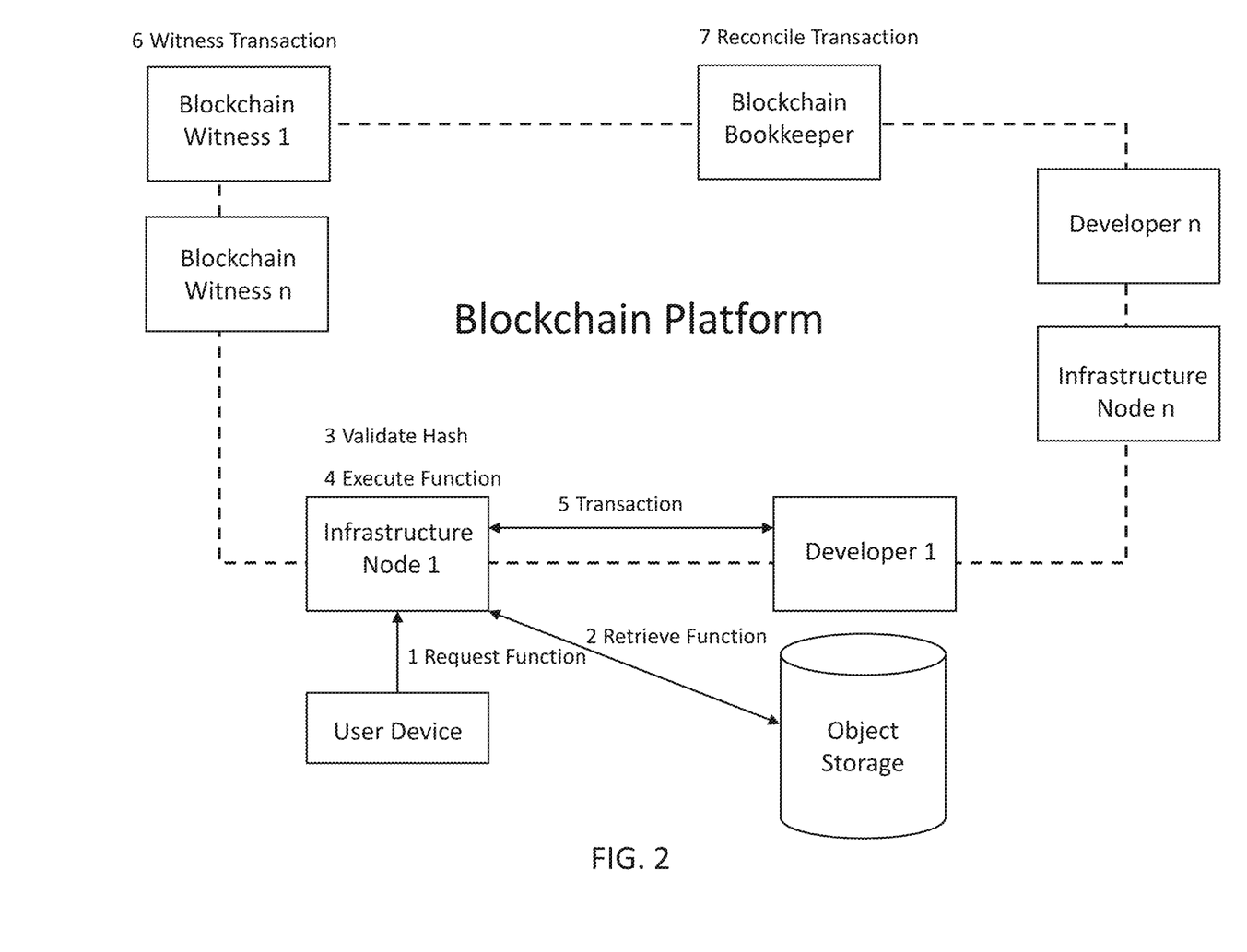
FIG. 2 illustrates a transaction process on a blockchain-based edge computing marketplace platform according to one embodiment of the present invention.

FIG. 2 illustrates a transaction process on a blockchain-based edge computing marketplace platform according to one embodiment of the present invention.

In one embodiment, a user device starts an application program and sends a function request to an infrastructure node. In one embodiment, the function request is an HTTP request to infrastructure node 1 via a web server for the blockchain-based edge computing marketplace platform in FIG. 2. Infrastructure node 1 then retrieves the function with a hash value from an object storage facility. Infrastructure node 1 validates the hash value of the retrieved function from the object storage on the blockchain platform, and then executes the function. A transaction for computing resource utilization of the function is executed between network node 1 and developer 1 who developed the function. In one embodiment, the infrastructure node has a provider blockchain account on the blockchain platform, including an account ID, at least one application ID, at least one function uniform resource identifier (URI), and at least one hash value for the at least one function. The transaction includes an application ID, its computing resource usage, and a log recording a function URI for the application. Peer developers and peer providers on the blockchain platform can be witnesses of the transaction. One witness is elected or volunteered to perform as a blockchain bookkeeper to reconcile the transaction on the blockchain. The transaction is then recorded on the immutable ledger.

Figure 3:
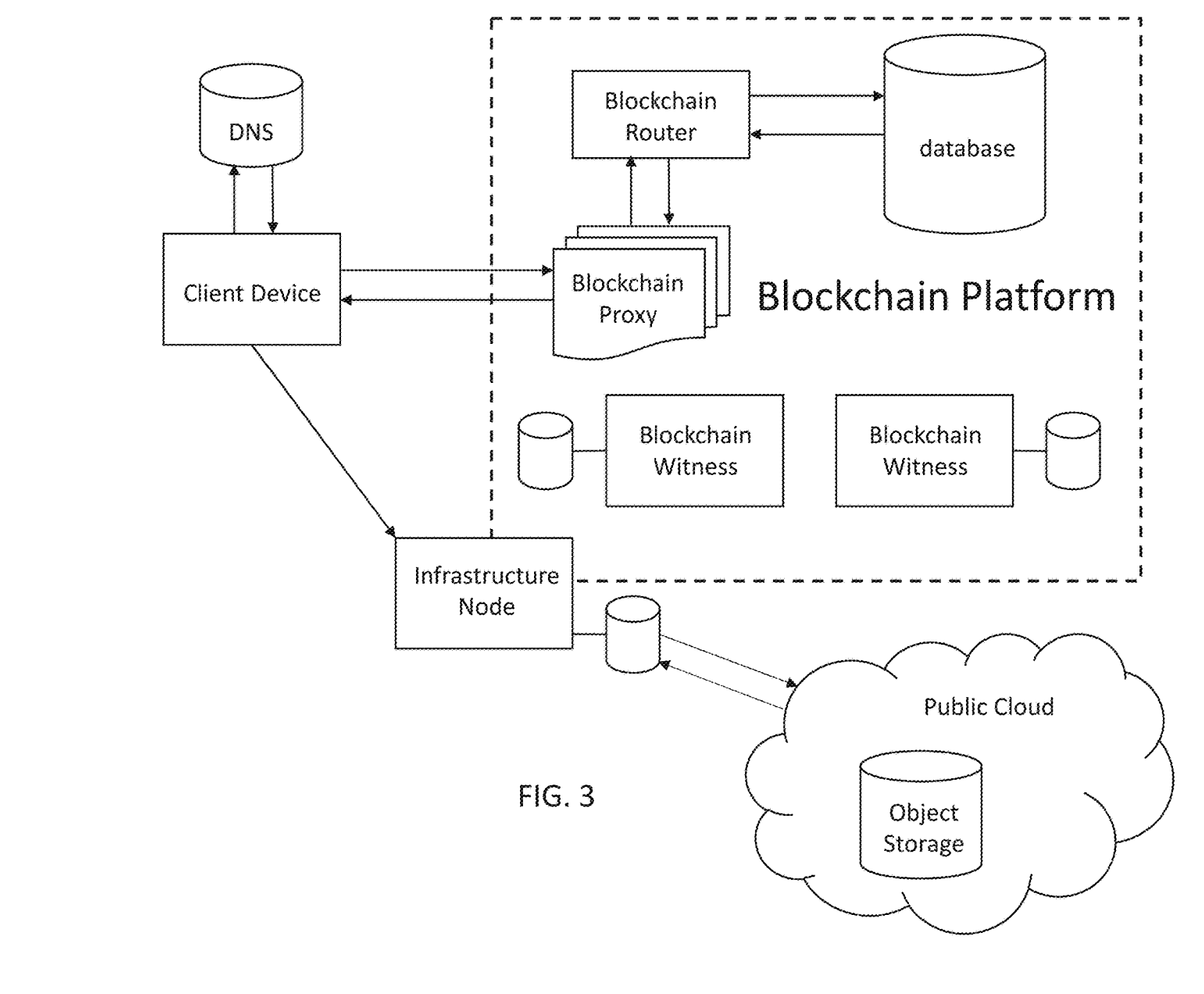
FIG. 3 illustrates an execution process for a serverless function via a blockchain platform according to one embodiment of the present invention.

FIG. 3 illustrates an execution process for a serverless function via a blockchain platform according to one embodiment of the present invention.

In one embodiment, a client device looks up an application ID in a domain name system (DNS) database, and the DNS database returns an address instance of a blockchain proxy hashed in the public cloud. The client device dereferences the application ID and a function name from the DNS. The client device then contacts the blockchain proxy and issues a request. The blockchain proxy communicates with a blockchain router to access to a database storing all infrastructure nodes and their states and coordinates. The database finds out which node is the nearest, available, and suitable for the request, and returns the result to the client device via the blockchain router and the blockchain proxy. The client device is then connected to the nearest infrastructure node on the blockchain platform. The nearest infrastructure node dereferences the application ID to obtain an account ID, a function, a function URL, and a hash value to the function. If the function is not located on the nearest network node, the network node will retrieve it from an object storage facility in the public cloud database and validate it. In one embodiment, the public cloud is Amazon Web Services, and the object storage facility is Simple Storage Service (S3). The infrastructure node then instantiates and executes the function.

In one embodiment, the blockchain-based edge computing marketplace platform provides web services. A web server for the blockchain-based edge computing marketplace platform provides a user interface (UI) for user devices, a command-line interface (CLI) for developers, a web server gateway for function executors. Web services provided by the blockchain-based edge computing marketplace platform via the web server includes but not limited to assets, accounts, wallets, functions, applications, and transactions. The web server of the edge computing network also interacts with object storage facilities to retrieve objects.

Figure 4:
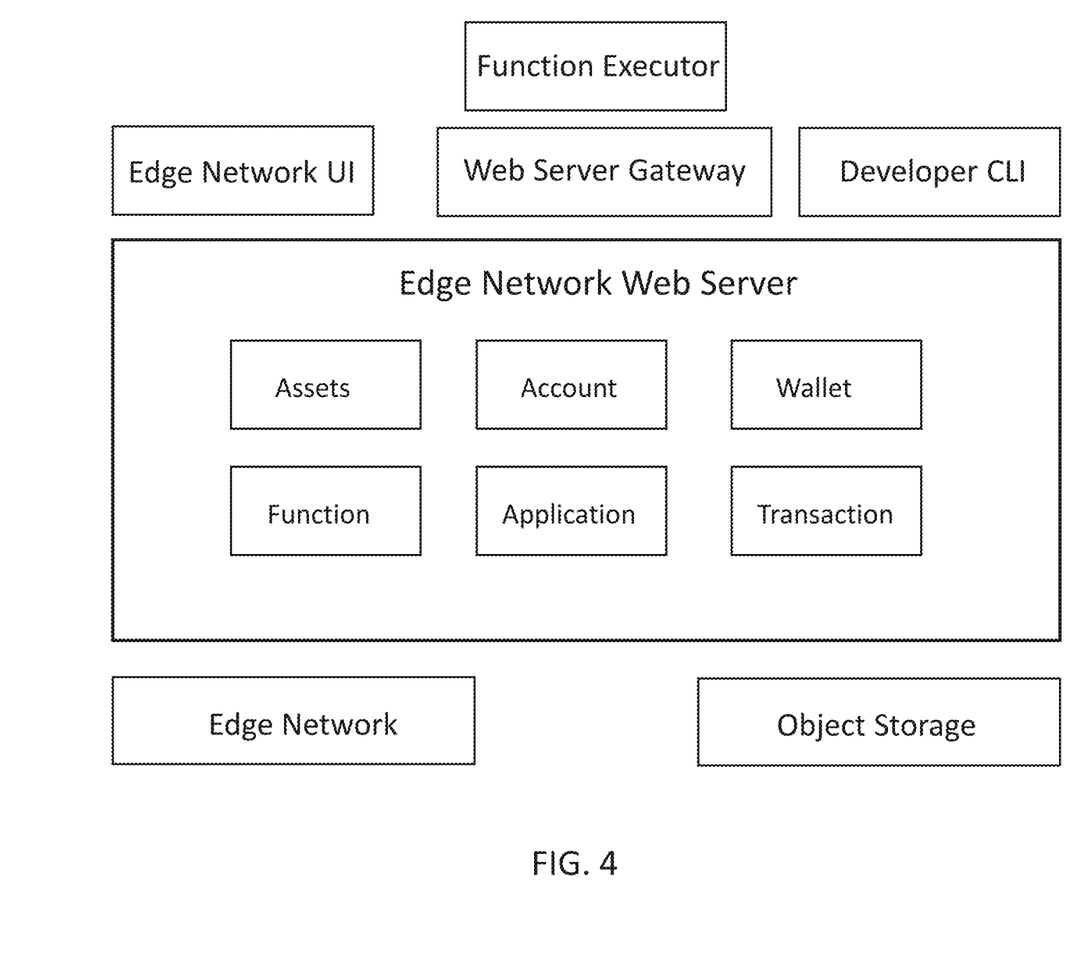
FIG. 4 illustrates an architecture of web services of the blockchain-based IT marketplace platform according to one embodiment of the present invention.

FIG. 4 illustrates an architecture of web services of the blockchain-based IT marketplace platform according to one embodiment of the present invention.

In one embodiment, the blockchain-based edge computing marketplace platform provides Representational State Transfer (REST) web services. REST is a software architectural style that defines a set of constraints to be used for creating web services. In one embodiment, blockchain-based edge computing marketplace platform provides native web services. In one embodiment, the web server is a NGINX web server. In one embodiment, the UI is built with React, a JavaScript library. In one embodiment, the function executors are v8 executors. In one embodiment, the object storage is built in InterPlanetary File System (IPFS) protocol, which provides a content-addressable, peer-to-peer method of storing and sharing hypermedia in a distributed file system.

In one embodiment, the blockchain-based edge computing marketplace platform executes a request for launching a function that consumes distributed computing resources from at least one provider within the platform. The blockchain-based edge computing market platform is operable to automatically locate the function, meter the resource consumption, and finalize the transaction between the developer and provider, wherein the transaction is recorded on the blockchain. Communications are managed on a distributed network structure with a distributed network protocol. In one embodiment, the blockchain-based edge computing marketplace platform is built on Hyperledger Fabric.

In one embodiment, the present invention provides for real-time (RT) digitization of physical assets with tokens via smart contracts that are automatically executed on the blockchain-based IT marketplace platform, and for digitization of metered utilization of those assets, including but not limited to hardware, software, facility assets (for example space, power, cooling, etc.), operations, networking, and combinations thereof.

Information Technology (IT) assets are tokenized, traded, and managed via smart contracts on a blockchain platform according to the present invention. In one embodiment, the blockchain-based IT marketplace platform is operable to tokenize distributed IT infrastructure, enable distributed IT computing resource providers to monetize their unused computing resources including CPU, memory, storage, storage I/O, network I/O, and WAN I/O. Transactions between providers, developers, and users are arranged and performed through smart contracts on the blockchain-based IT marketplace platform. In one embodiment, the cryptocurrency token kWT on the blockchain-based IT marketplace platform is used to facilitate the transactions. In one embodiment, different security tokens, for example, hardware tokens, facility tokens, and operations tokens, are created representing different resources.

Figure 5:
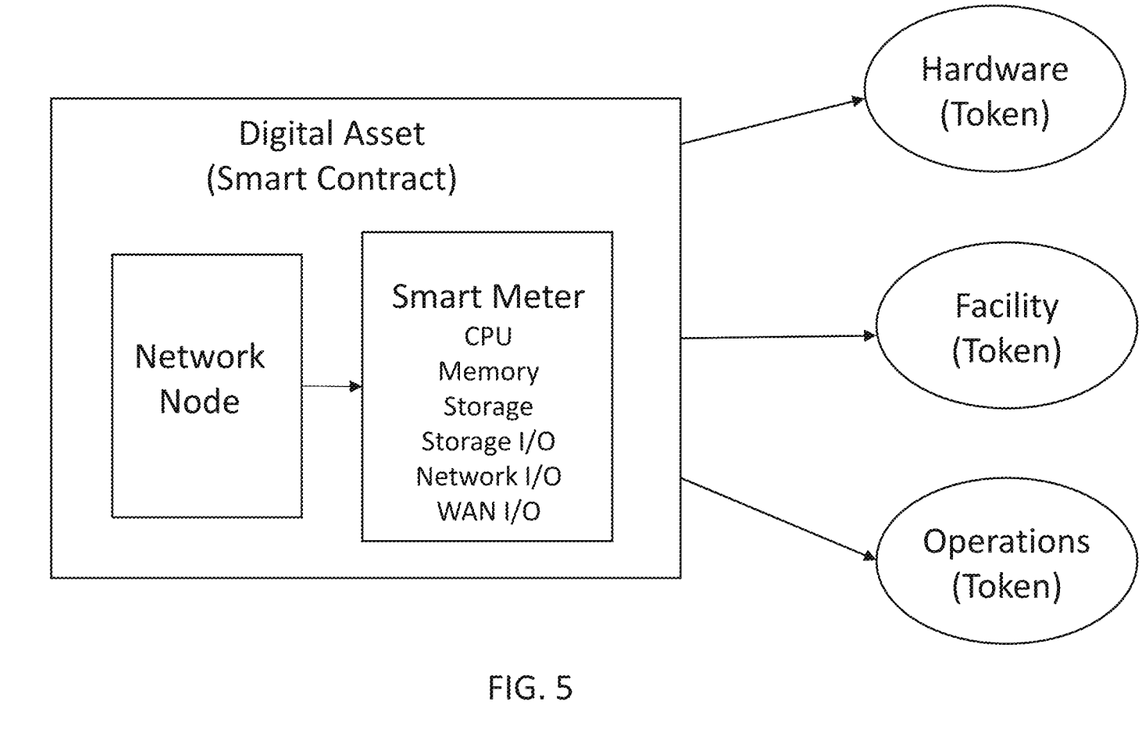
FIG. 5 illustrates IT computing resource tokenization according to one embodiment of the present invention.

FIG. 5 illustrates IT computing resource tokenization according to one embodiment of the present invention.

In one embodiment, every node on the distributed IT infrastructure is connected to the blockchain-based IT marketplace platform via a smart meter for metering computing resource usage. In one embodiment, the smart meter is a WAC-based smart meter. The WAC-based smart meter is operable to measure the computing resources including CPU, memory, storage, storage I/O, Network I/O, and WAN I/O, and repackage and digitize the computing resources into at least one type of token associated with the physical assets and services (e.g. maintenance, staff, software-as-a-service, etc.) provided by the network nodes. For example, there can be hardware tokens, facility tokens, operations tokens, etc.

In one embodiment, the blockchain-based edge computing marketplace platform of the present invention is operable to cache secure sockets layer (SSL) certificates, functions, and objects to accelerate executions. In one embodiment, the blockchain-based edge computing marketplace platform of the present invention is operable to manage and purge objects, evaluate caches, and invalidate caches based on the state of the blockchain. Thus, the blockchain-based edge computing marketplace platform includes command and control function within the blockchain, and the state of cached objects can be tethered to the blockchain.

Figure 6:
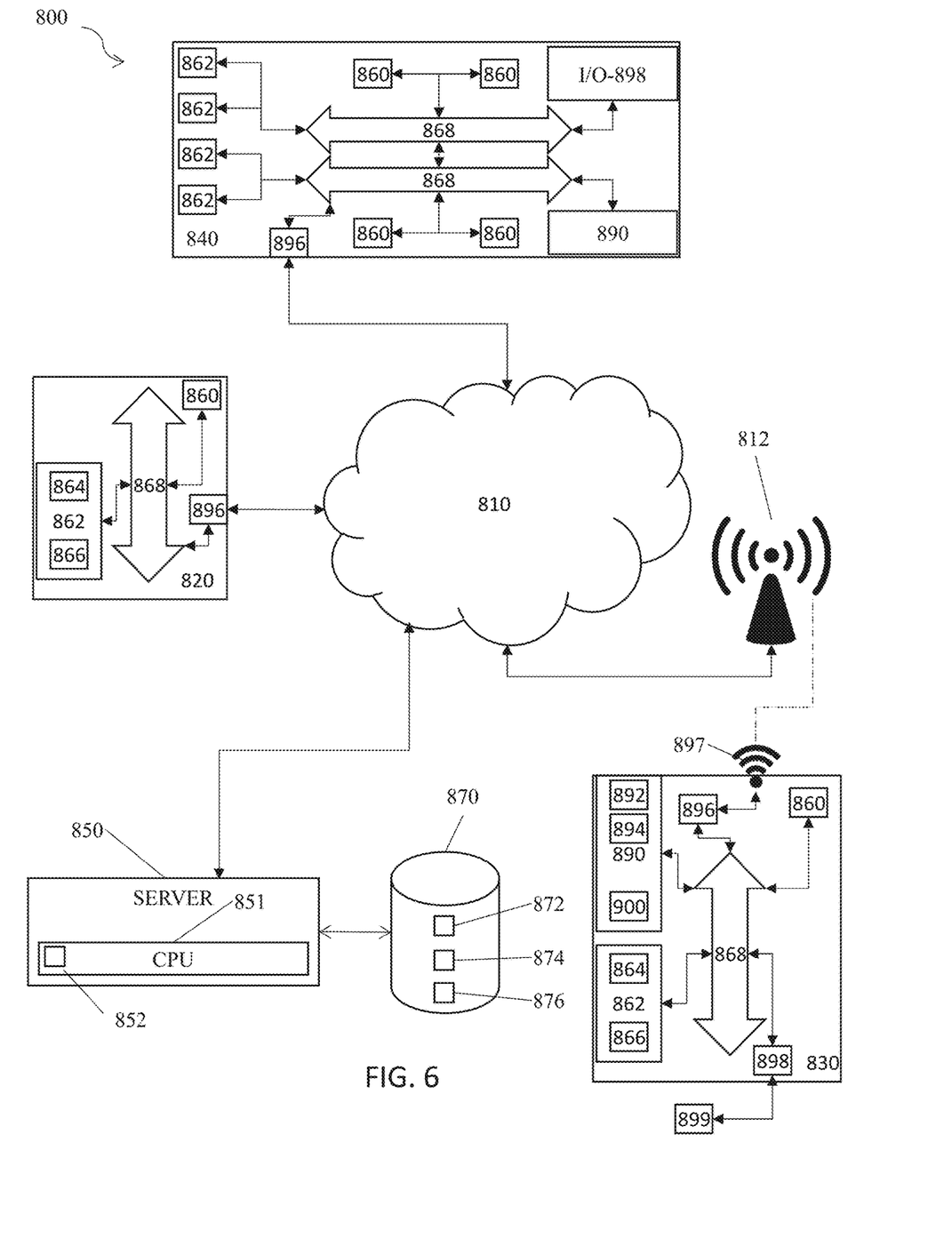
FIG. 6 is a schematic diagram of a system of the present invention.

FIG. 6 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 6, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non- volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 6, is operable to include other components that are not explicitly shown in FIG. 6, or is operable to utilize an architecture completely different than that shown in FIG. 6. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for managing computing resources comprising:
   a ledger-based edge computing marketplace platform, wherein the ledger-based edge computing marketplace platform is operable to communicate with at least one client device;
   at least one smart meter operable to measure edge computing resource capacity and/or edge computing resource consumption; and
   at least one infrastructure node, wherein the at least one infrastructure node is operable to communicate with the ledger-based edge computing marketplace platform, the at least one client device, and the at least one smart meter;
   wherein the ledger-based edge computing marketplace platform includes at least one application program;
   wherein the at least one infrastructure node is operable to receive a function request from the at least one client device, wherein the function request is related to the at least one application program;
   wherein the at least one infrastructure node is operable to retrieve a function related to the function request;
   wherein execution of the function results in at least one computing resource transaction; and
   wherein the at least one computing resource transaction is recorded on an immutable ledger.

2. The system of claim 1, wherein the at least one infrastructure node is associated with an account, wherein the account includes an account ID, an application identifier (ID), a function uniform resource identifier (URI), and/or a hash value for the function.

3. The system of claim 1, wherein the edge computing resource capacity and/or the edge computing resource consumption is a measurement based on a central processing unit (CPU) clock speed, a memory capacity value, a storage value, a disk input/output (I/O) value, and a local area network (LAN) I/O value.

4. The system of claim 1, wherein the at least one computing resource transaction includes an application identifier (ID), the edge computing resource consumption, and/or a log recording a function uniform resource identifier (URI) for the at least one application program.

5. The system of claim 1, wherein the function corresponding to the function request includes a hash value, wherein the at least one infrastructure node is operable to validate the hash value for the function corresponding to the function request, wherein the function transitions to a validated function once the hash value for the function is validated, and wherein execution of the validated function results in the at least one computing resource transaction.

6. The system of claim 1, wherein the at least one computing resource transaction includes a real-time digitization of physical computing assets and/or tokens from at least one smart contract executed on the ledger-based edge computing marketplace platform.

7. The system of claim 1, further comprising a web server operable to interact with an object storage server, provide a command-line interface (CLI) for at least one application program developer, and/or provide a web server gateway for at least one function executor.

8. The system of claim 1, wherein the at least one computing resource transaction is operable to be validated by at least one witness device.

9. A system for managing computing resources comprising:
   a ledger-based edge computing marketplace platform, wherein the ledger-based edge computing marketplace platform is operable to communicate with at least one client device;
   at least one infrastructure node, wherein the at least one infrastructure node is operable to communicate with the ledger-based edge computing marketplace platform and the at least one client device;
   an infrastructure node database, wherein the infrastructure node database is operable to store information corresponding to the at least one infrastructure node; and a domain name system (DNS) database, wherein the DNS database is operable to receive a first query request from the at least one client device;

wherein the ledger-based edge computing marketplace platform includes at least one application program with at least one function;

wherein the DNS database is operable to send a first query response to the at least one client device;

wherein the first query response is an address instance of a proxy;

wherein the proxy is operable to receive a second query request from the at least one client device, wherein the second query request contains the at least one function;

wherein the proxy is operable to send a second query response to the at least one client device, wherein the second query response indicates a nearest infrastructure node from the at least one infrastructure node; and wherein the at least one function is executed using the nearest infrastructure node.

10. The system of claim 9, wherein the first query response includes an application identifier (ID) and/or a function name from the DNS database.

11. The system of claim 9, wherein the at least one application program includes an application identifier (ID), wherein the nearest infrastructure node dereferences the application ID to obtain an account ID, a function, a function uniform resource locator (URL), and a hash value for the at least one function.

12. The system of claim 9, wherein if the at least one function is not located on the nearest infrastructure node, then the nearest infrastructure node retrieves the at least one function from an object storage server in a cloud database.

13. The system of claim 9, further comprising at least one router operable to communicate with the ledger-based edge computing marketplace platform, wherein the at least one router is operable to access the infrastructure node database.

14. The system of claim 9, wherein executing the at least one function includes at least one transaction for computing resources, and wherein the at least one transaction for computing resources is recorded on an immutable ledger.

15. A method for managing computing resources comprising:

providing a ledger-based edge computing marketplace platform operable to communicate with at least one client device, at least one smart meter for measuring edge computing resource capacity and/or edge computing resource consumption, and at least one infrastructure node;

accessing at least one application program over a network using the at least one client device;

the at least one infrastructure node receiving a function request from the at least one client device, wherein the function request corresponds to the at least one application program;

the at least one infrastructure node retrieving a function corresponding to the function request;

executing at least one transaction for computing resource associated with running the at least one application program on the at least one client device; and recording the at least one computing resource transaction on an immutable ledger.

16. The method of claim 15, further comprising the at least one smart meter measuring the edge computing resource capacity and/or the edge computing resource consumption based on a central processing unit (CPU) clock speed, a memory capacity value, a storage value, a disk input/output (I/O) value, and a local area network (LAN) I/O value.

17. The method of claim 15, wherein the at least one infrastructure node is associated with an account, wherein the account includes an account ID, an application identifier (ID), a function uniform resource identifier (URI), and/or a hash value for the function.

18. The method of claim 15, further comprising executing at least one smart contract on the ledger-based edge computing marketplace platform, wherein the at least one computing resource transaction includes a real-time digitization of physical computing assets and/or tokens from the at least one smart contract.

19. The method of claim 15, wherein the function corresponding to the function request includes a hash value, further comprising the at least one infrastructure nodes validating the hash value for the function corresponding to the function request, wherein the function transitions to a validated function once the hash value for the function is validated.

20. The method of claim 15, further comprising validating the at least one computing resource transaction using at least one witness device.

* * * * *